Dec. 13, 1960 A. F. MAYDEW Re. 24,907
AUTOMATIC PIPE LAYER AND RACKER
Original Filed Dec. 7, 1954 3 Sheets-Sheet 1
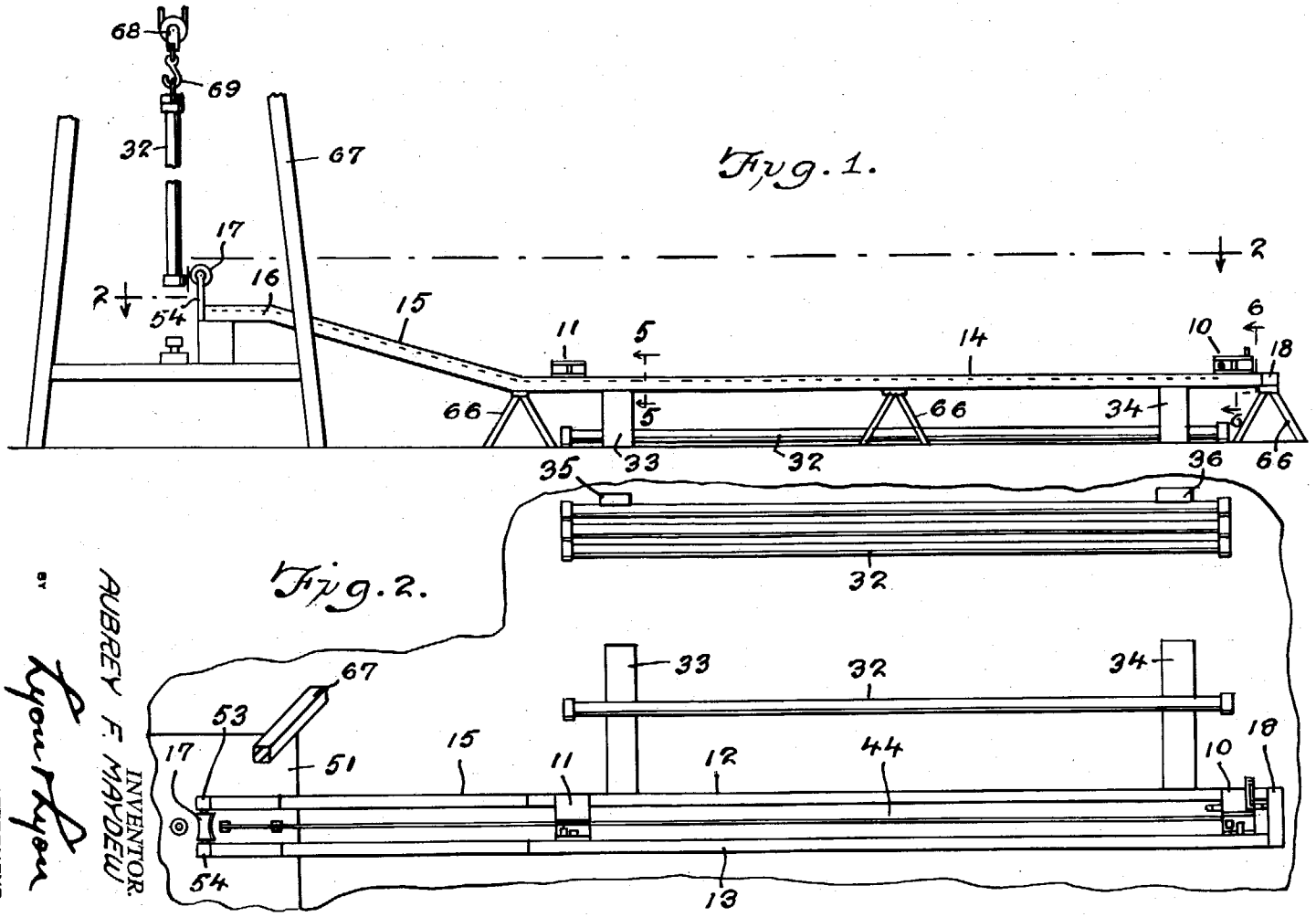
INVENTOR.
AUBREY F. MAYDEW
BY Lyon & Lyon
ATTORNEYS AUTOMATIC PIPE LAYER AND RACKER
Original Filed Dec. 7, 1954 3 Sheets-Sheet 2
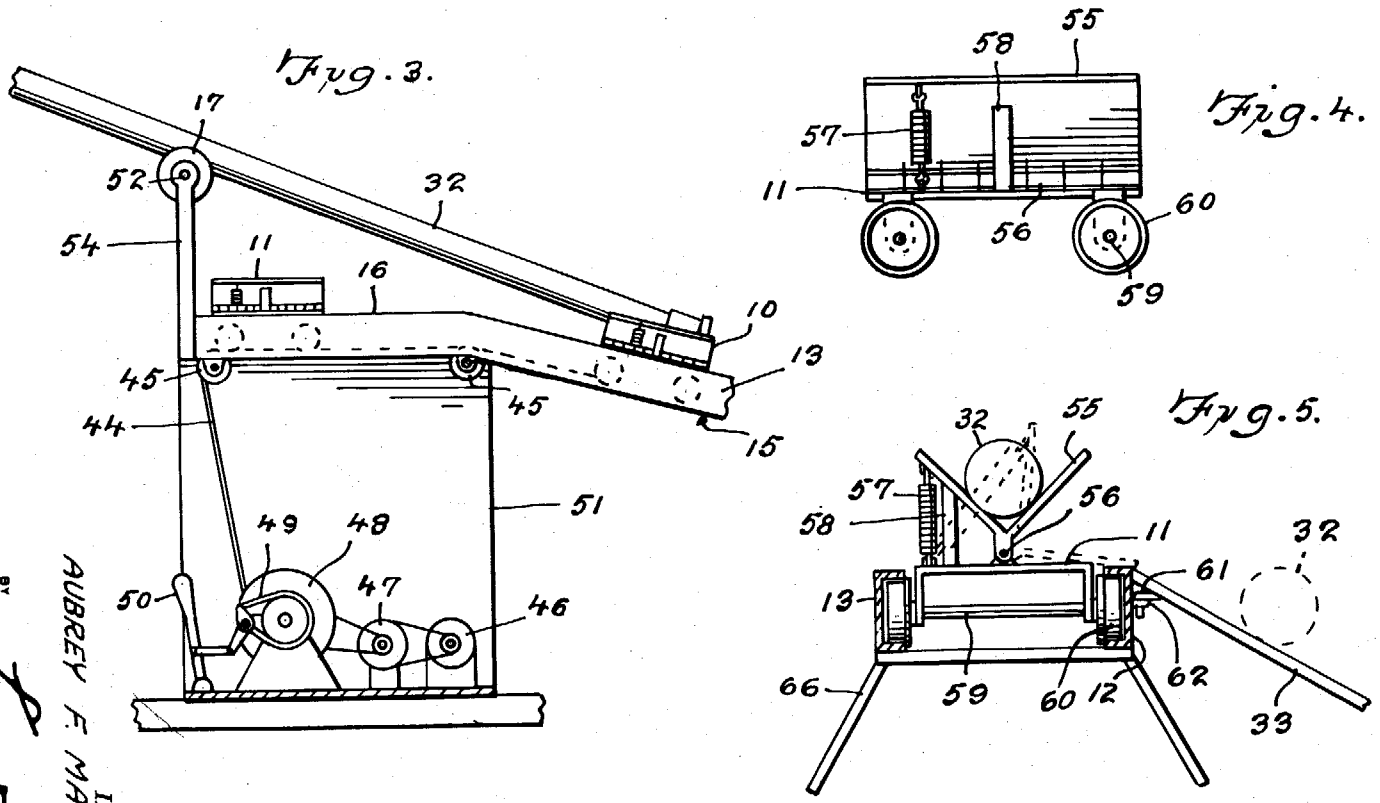
INVENTOR.
AUBREY F. MAYDEW
BY Lyon & Lyon
ATTORNEYS AUTOMATIC PIPE LAYER AND RACKER
Original Filed Dec. 7, 1954 3 Sheets-Sheet 3
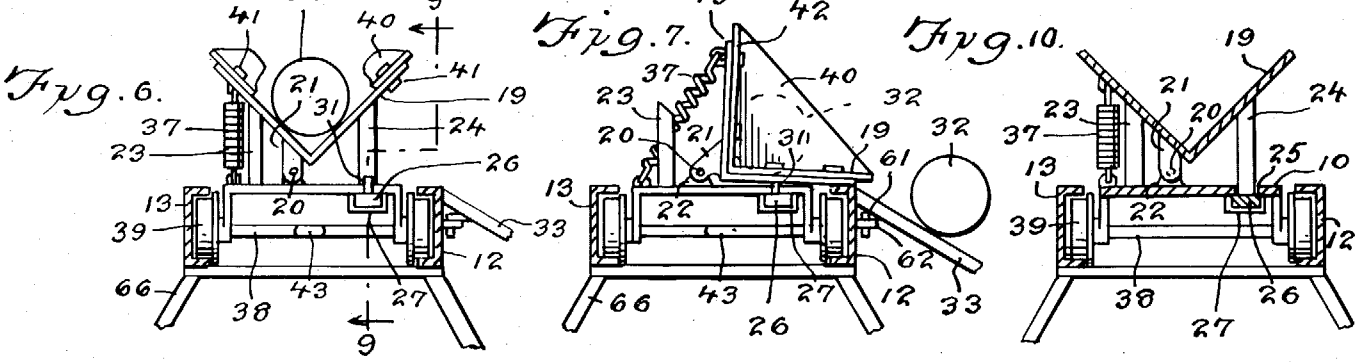
Fig. 6.
Fig. 7.
Fig. 10.
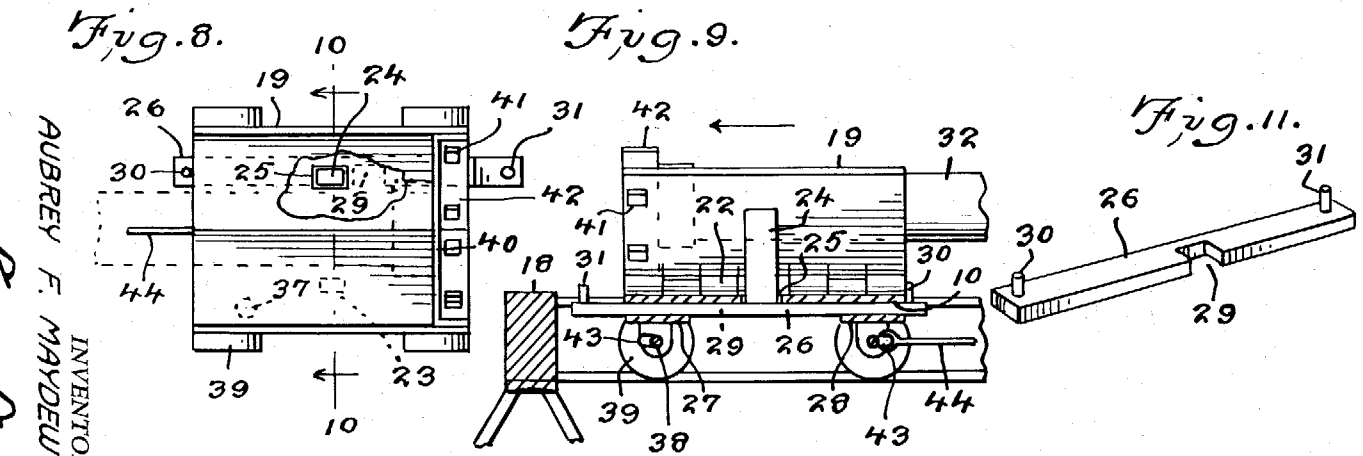
Fig. 8.
Fig. 9.
Fig. 11.
INVENTOR.
AUBREY F. MAYDEW
BY Lyon & Lyon
ATTORNEYS United States Patent Office Re. 24,907
Reissued Dec. 13, 1960

24,907

AUTOMATIC PIPE LAYER AND RACKER

Aubrey F. Maydew, 226 Mount View, Taft, Calif.

Original No. 2,852,147, dated Sept. 16, 1958, Ser. No. 473,507, Dec. 7, 1954. Application for reissue Aug. 13, 1959, Ser. No. 833,660

8 Claims. (Cl. 214—2.5)

Matter enclosed in heavy brackets [ ] appears in the original patent but forms no part of this reissue specification; matter printed in italics indicates the additions made by reissue.

This invention relates to pipe handling devices particularly adapted for taking pipe from a well drilling rig and placing the pipe in a rack, and in particular a pair of cars positioned on a track having an inclined section therein and the track is positioned whereby a section of pipe from a well drilling rig is readily positioned on the cars which carry the pipe down an incline to a horizontal section of the track where a stop on the end of the track trips a latch on the leading car and the section of pipe is automatically dumped upon a rack.

The purpose of this invention is to provide mechanical means for taking sections of pipe from a well drilling rig and placing the sections in a rack with the ends of the sections even.

Various devices have been provided for receiving, stacking, or racking pipe sections from well drilling rigs, however, it is difficult to stop the pipe carrying elements whereby the pipe rolls to a stack having a neat appearance on a rack and wherein the pipe carrying elements automatically return to a position for receiving another section of pipe. With this thought in mind this invention contemplates a pipe laying and racking device wherein it is only necessary to tilt the pipe to one side and position one end on a car and this car in combination with a second car carries the pipe to a predetermined position, dumps the pipe and then returns to the starting position for another section of pipe.

The object of this invention is, therefore, to provide means for forming a pipe laying and racking device whereby the pipe is evenly racked and the racking means returns to a position for receiving another section of pipe.

Another object of the invention is to provide means for tripping cars carrying sections of pipe whereby the sections of pipe are dumped at a predetermined point and wherein the sections are racked with the ends even.

A further object of the invention is to provide a pipe laying and racking device which is of a comparatively simple and economical construction.

With these and other objects and advantages in view the invention embodies an elongated track having a horizontal section and an inclined section, pipe carrying cars positioned to travel on the track, means at the end of the track for stopping one of the cars and releasing a latch thereon, and means returning the cars to a position for receiving another section of pipe.

Other features and advantages of the invention will appear from the following description taken in connection with the drawings, wherein:

Figure 1 is a side elevational view illustrating a pipe carrying and racking track extended from one side of a well rig or derrick and showing cars on the track with the cars in a position of stopping a section of pipe.

Figure 2 is a plan view of the pipe carrying rack shown in Figure 1 being taken on line 2—2 thereof.

Figure 3 is a side elevational view similar to that shown in Figure 1 illustrating the inner end of the track and showing, on an enlarged scale, a section of pipe being placed on one of the cars and the mechanism for returning the cars.

Figure 4 is a side elevational view illustrating one of the cars.

Figure 5 is a cross section taken on line 5—5 of Figure 1 showing a section through the track and illustrating a car positioned on the track with the car in the pipe carrying position in full lines and in a dumping position in dotted lines.

Figure 6 is a cross section similar to that shown in Figure 5 and taken on line 6—6 of Figure 1 showing an end view of the dumping car wherein a latch is provided for retaining the car in the pipe carrying position as shown.

Figure 7 is a similar view showing the car as shown in Figure 6 with the latch released and with the pipe holding section of the car turned about the pivot to dump a section of pipe.

Figure 8 is a plan view of the car shown in Figure 7 showing the car in upright position and having part of the car bottom broken away to illustrate the latch.

Figure 9 is a longitudinal section through the car illustrating the latch in a position of retaining the car upright, said section being taken on line 9—9 of Figure 6.

Figure 10 is a cross section taken on line 10—10 of Figure 8 illustrating the construction of the latch for retaining the V-shaped body of the car in the pipe carrying position.

Figure 11 is a detail illustrating the sliding latch used in the chassis of a car for holding the car in an upright position.

Referring now to the drawings wherein like reference characters denote corresponding parts the improved pipe laying and racking device of this invention includes a leading car 10, a following car 11, a track formed with side channels 12 and 13 and having a horizontal section 14, an inclined section 15 and a loading section 16, and, as illustrated in Figure 1, the loading section 16 is provided with a feed roller 17 rotatably mounted by a shaft 52 in arms 53 and 54, and the horizontal section 14 is provided with a stop 18.

The car 10 is provided with a V-shaped body 19 which is pivotally mounted by a pin 20 which extends through hubs 21 on the body 19 of the car and meshing hubs 22 extended upwardly from the upper surface of the car.

The V-shaped body 19 is supported at one side with a stationary leg 23 that is fixedly mounted on the car platform, on one side and with a leg or strut 24 on the opposite side, which is positioned to support the car body 19 and which extends through an opening 25 in the deck or platform of the car.

The strut 24 of the car body 19 rests upon a latch bar 26 slidably mounted in bearings or brackets 27 and 28 on the undersurface of the car 10 and the latch bar is provided with a notch 29 that is positioned to receive the lower end of the strut 24. The ends of the latch bar 26 are provided with pins 30 and 31 that limit the sliding movement thereof.

With the latch bar 26 positioned as illustrated in Figure 9, the end of the bar will engage the stop 18 as the car approaches the end of the track and upon engagement of the latch bar with the stop the latch bar will slide through the brackets with the notch 29 registering with the lower end of the strut 24 and positioned to receive said strut. The weight of pipe, as indicated by the numeral 32 in the car will cause the strut 24 to drop through a notch 29, and with the car body 19 unsupported on this side it will tilt from the position shown in Figures 6 and 10, turning to that shown in Figure 7 and the pipe will roll from the car down inclined struts 33 and 34, until it comes to rest against posts 35 and 36, as shown in Figure 2.

As the pipe is released from the car a spring 37 attached to the platform of the car at one end and to the body 19 at the other returns the body 19 to the position shown in Figures 6 and 10 urging the body against the stationary leg 23 and the latch bar 26 may then be moved inwardly from the end opposite to the end engaged by the stop and the leg 24 inserted in the opening 25 to retain the body 19 in the pipe carrying position.

The car 10 is provided with axles 38 on the ends of which wheels 39 are mounted, and with the wheels positioned in the channels 12 and 13 of the track the car is free to travel in either direction in the track.

One end of the car is provided with an end plate 40 that is secured in position in the end of the car by bolts 41 that extend through a continuous flange 42.

The ends of the car are provided with eyes 43 and a cable 44 is attached to an eye at one end whereby, with the cable extended through the track and over idler rollers 45, the car may be returned to the starting or pipe receiving position by a motor 46 which may be positioned in the housing 51. The motor is connected by a train of gears or belts, as indicated by the numeral 47 to a drum 48 and the drum is controlled by a clutch 49 which is operated by a hand lever 50.

The car 11 is similar to the car 10 except that the latch is omitted and the V-shaped body 55 is pivotally mounted on the car with a hinge member 56 and the body is retained in an upright position by a spring 57 which holds the body against a strut 58. The car 11 is also provided with axles 59 and wheels 60 which are mounted on the ends of the axles and positioned to travel in the channels 12 and 13 of the track.

With the parts in this position the spring retains the body in an upright position as long as the body 19 of the car 10 remains upright and when the latch releases the body 19 the weight of the pipe overcomes the tension of the spring 57 whereby the body 55 turns with the body 19, dumping the pipe down the inclined struts or skids 33 and 34.

The struts 33 and 34 are retained in position on the side of the track by hooks 61 which are positioned in eyes 62, as shown in Figure 5.

The track is provided with supports 66 that are preferably positioned as shown in Figure 1.

With the parts arranged in this manner a section of pipe, as indicated by the numeral 32 is drawn upwardly by the drill rig or derrick 67 with the pipe extending from a pulley block 68 to which it is attached by a hook 69 and as the lower end of the pipe passes above the guide roller 17 the end is placed in the car 10, as shown in Figure 3 whereby the car travels with the pipe thereon down the incline with the opposite end dropping into the car 11. The force of gravity carries the cars downwardly to the horizontal section 14 of the track and as the leading car strikes the stop the latch is released and the section of pipe rolls down the inclined struts or skids to a position against the posts 35 and 36. With the stop 18 positioned at a common point the cars stop at the same place each time whereby the ends of the pipe deposited in the rack are in common parallel planes and the rack with the pipe therein has a neat appearance.

As soon as the section of pipe is released from the cars a motor, drawing on the cable 44, returns the car 10 to the loading position and the car 10 carries the car 11 to the position shown in Figure 3 as it is drawn upwardly on the track by the cable.

It will be understood that modifications may be made in the design and arrangement of the parts without departing from the spirit of the invention.

What is claimed is:

1. A pipe laying and racking device comprising a track having a horizontally disposed pipe unloading section, a horizontally disposed pipe loading section, an inclined section connecting the loading and unloading sections, and having a stop at the extended end of said unloading section, a plurality of cars having wheels positioned to travel on said track, V-shaped body members pivotally mounted on said cars, springs on the cars for urging said body members to pipe carrying positions, a vertically disposed strut mounted in the body of one of the cars and extended upwardly for supporting the body in a horizontally disposed position and a latch mounted in the car in which the strut is positioned to retain the strut in an upwardly disposed and body supporting position for retaining the body member thereof in the pipe carrying position, said latch positioned to engage the stop at the extended end of the pipe unloading section of the track for releasing the said body member.

2. In a pipe laying and racking device as described in claim 1, means for returning the cars to the loading position.

3. In a pipe laying and racking device as described in claim 1, means for returning the cars to pipe receiving positions on the loading section of the track, and a guide roller rotatably mounted at the end of said loading section of the track for feeding pipe sections to the said cars.

4. A pipe laying and racking device as described in claim 1 wherein the cars are provided with vertically positioned stationary stops and the springs urged the V-shaped body members against said stops.

5. In a pipe laying and racking device as described in claim 1, a rack positioned to receive pipe sections unloaded from the cars, means returning the cars to the loading section of the track, and a guide roller positioned above said loading section of the track for guiding pipe in said cars.

*6. A pipe laying and racking device comprising, in combination: a track having an inclined section and a horizontal pipe unloading section connected thereto, the track having an element fixed with respect thereto, a leading car and a following car each adapted to travel on said track, each car having a pipe-supporting body member, means mounting the body member on each of said cars for movement between a pipe-supporting position and a pipe-dumping position, means on the leading car engageable with said fixed element to cause gravity actuated movement of the body member thereon to pipe-dumping position, said mounting means for the body member on the following car being located so as to cause that body member to move to pipe-dumping position by change in attitude of a pipe thereon when the forward end thereof is dumped from the leading car, whereby a pipe may be transported along the track away from said inclined section and dumped laterally from the cars.*

*7. A pipe laying and racking device comprising, in combination: a track having an inclined section and a horizontal pipe unloading section connected thereto, the track having a stop at the extended end of said unloading section, a leading car and a following car each adapted to travel on said track, each car having a pipe-supporting body member, means pivotally mounting the body member on each of said cars for movement between a pipe-supporting position and a pipe-dumping position, means on the leading car engageable with said stop to cause gravity actuated movement of the body member on said leading car to pipe-dumping position, said mounting means for the body member on the following car being located so as to cause that body member to move to pipe-dumping position by change in attitude of a pipe thereon when the forward end thereof is dumped from the leading car, whereby a pipe may be transported along the track away from said inclined section and dumped laterally from the cars.*

*8. A pipe laying and racking device comprising, in combination: a track having an inclined section and a horizontal pipe unloading section connected thereto, the unloading section being adapted for placement alongside a pipe rack, the track having an element fixed thereon, a leading car and a following car each having wheels adapted to travel on said track, each car having a pipe-*

*supporting body member, means pivotally mounting the body member on each of said cars for movement between a pipe-supporting position and a pipe-dumping position, means on one of said cars engageable with said fixed element to cause movement of the body member thereon to pipe-dumping position, said mounting means for the body member on the other of said cars being located so as to cause that body member to move to pipe-dumping position by movement of a length of pipe supported thereon occasioned by dumping action initiated by engagement with said fixed element, whereby a length of pipe may be transported along the track away from said*

*inclined section and dumped laterally from the cars onto the pipe rack.*

References Cited in the file of this patent or the original patent

UNITED STATES PATENTS

| | | |
|---|---|---|
| 804,412 | Kelly | Nov. 14, 1905 |
| 2,198,644 | Wettengel | Apr. 30, 1940 |
| 2,335,719 | Williams | Nov. 30, 1943 |
| 2,448,324 | Pool | Aug. 31, 1948 |
| 2,589,181 | Yount | Mar. 11, 1952 |
| 2,615,585 | Menhall | Oct. 28, 1952 |
| 2,728,602 | Casey | Dec. 27, 1955 |